(12) United States Patent
Zhang et al.

(10) Patent No.: US 12,174,699 B2
(45) Date of Patent: Dec. 24, 2024

(54) SELECTIVE DECODING FOR SUPER CHIP-KILL RECOVERY AND METHOD OF OPERATING SUCH MEMORY SYSTEM

(71) Applicant: SK hynix Inc., Gyeonggi-do (KR)

(72) Inventors: Fan Zhang, San Jose, CA (US); Meysam Asadi, San Jose, CA (US); Ahmad Golmohammadi, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/106,087

(22) Filed: Feb. 6, 2023

(65) Prior Publication Data

US 2024/0264903 A1    Aug. 8, 2024

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/1004* (2013.01)

(58) Field of Classification Search
CPC . G06F 11/076; G06F 11/1004; G06F 11/1068
See application file for complete search history.

(56) References Cited

U.S. PATENT DOCUMENTS

| | | | |
|---|---|---|---|
| 2010/0042896 A1* | 2/2010 | Gunnam | H03M 13/3753 714/752 |
| 2010/0199149 A1* | 8/2010 | Weingarten | G11C 11/5621 711/E12.001 |
| 2014/0325318 A1 | 10/2014 | Marrow et al. | |
| 2019/0155688 A1* | 5/2019 | Kumar | H03M 13/45 |
| 2019/0213072 A1* | 7/2019 | Kumar | G06F 11/1004 |
| 2019/0250986 A1* | 8/2019 | Kumar | G06F 11/1012 |
| 2019/0305890 A1* | 10/2019 | Kumar | H03M 13/098 |
| 2022/0129180 A1 | 4/2022 | Kim et al. | |

OTHER PUBLICATIONS

X. Jian, N. DeBardeleben, S. Blanchard, V. Sridharan and R. Kumar, "Analyzing Reliability of Memory Sub-systems with Double-Chipkill Detect/Correct," 2013 IEEE 19th Pacific Rim International Symposium on Dependable Computing, Vancouver, BC, Canada, 2013, pp. 88-97, doi: 10.1109/PRDC.2013.18. (Year: 2013).*
Yeong-Hyeon Kwon, Mi-Kyung Oh and Dong-Jo Park, "A new LDPC decoding algorithm aided by segmented CRCs for erasure channels," 2005 IEEE 61st Vehicular Technology Conference, Stockholm, Sweden, 2005, pp. 705-708 vol. 1, doi: 10.1109/VETECS. 2005.1543384. (Year: 2005).*

* cited by examiner

*Primary Examiner* — Albert Decady
*Assistant Examiner* — Enamul M Kabir
(74) *Attorney, Agent, or Firm* — IP & T GROUP LLP (57) ABSTRACT

A memory system having a memory block and a memory controller in communication with the memory block. The memory controller is configured to: decode codewords from the memory block, identify failed codewords from the decoded codewords, estimate raw bit errors RBERs of the failed codewords, sort failed codewords from a failed sector of the memory block in order from a first set of the failed codewords in the failed sector having a higher probability of being successfully decoded to a second set of the failed codewords in the failed sector having a lower probability of being successfully decoded, and perform a super chip kill SCK operation on one of the failed codewords in the first set to produce a recovered codeword.

20 Claims, 8 Drawing Sheets

Set k=0, failed_rbers=[];
For i ∈ [1,n],
- Decode $c_i$
- If decoding succeeds:
    - Change the XOR result using hard decision of c_i
- Else:
    - Estimate RBER = $\hat{r}_i$ using decoder observables
    - Store pair (i, $\hat{r}_i$) in failed_rbers
    - Increase k=k+1

Sort failed_rbers in ascending order, and call them $\{c_1', ..., c_k'\}$
For j ∈ [1,k]:

- If $\hat{r}_j' <$ RBER$_{sck}$(k)
    - Apply SCK to recover failed sector $c_j'$
    - If $c_j'$ =intended host codeword and decoding succeeds:
        - Declare decoding failure
    - Otherwise
        - Declare SCK failure

- Otherwise
    - Declare SCK failure

FIG. 9

SELECTIVE DECODING FOR SUPER CHIP-KILL RECOVERY AND METHOD OF OPERATING SUCH MEMORY SYSTEM

BACKGROUND

1. Field

Embodiments of the present disclosure relate to a memory system with a scheme to generate chip-kill parity, and method of operating such memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

The two main types of flash memories are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NOR-type flash allows a single machine word (byte) to be written to an erased location or read independently. The NAND-type flash memory operates primarily in memory cards, USB flash drives, solid-state drives (SSDs), and similar products, for general storage and transfer of data.

A flash memory, e.g., of the NAND-type, may apply any of various error correction codes to correct errors in data. One such error correction code is low-density parity-check code (LDPC), which is an advanced error code that is used to recover a relatively large number of errors in data. In this context, embodiments of the present invention arise.

SUMMARY

In one embodiment of the present invention, there is provided a memory system having a memory block, and a memory controller in communication with the memory block, wherein the memory controller is configured to: decode codewords from the memory block, identify failed codewords from the decoded codewords, estimate raw bit errors RBERs of the failed codewords, sort failed codewords from a failed sector of the memory block in order from a first set of the failed codewords in the failed sector having a higher probability of being successfully decoded to a second set of the failed codewords in the failed sector having a lower probability of being successfully decoded, and perform a super chip kill SCK operation on one of the failed codewords in the first set to produce a recovered codeword.

In one embodiment of the present invention, there is provided a method for selective decoding a memory block using super chip kill SCK, comprising: decoding codewords from the memory block; identifying failed codewords from the decoded codewords; estimating raw bit errors RBERs of the failed codewords; sorting failed codewords from a failed sector of the memory block in order from a first set of the failed codewords in the failed sector having a higher probability of being successfully decoded to a second set of the failed codewords in the failed sector having a lower probability of being successfully decoded, and performing a super chip kill SCK operation on one of the failed codewords in the first set to produce a recovered codeword.

Additional aspects of the present invention will become apparent from the following description.

DETAILED DESCRIPTION

Various embodiments are described below in more detail with reference to the accompanying drawings. The present invention may, however, be embodied in different forms and thus should not be construed as limited to the embodiments set forth herein. Rather, these embodiments are provided so that this conveys the scope of the present invention to those skilled in the art. Moreover, reference herein to "an embodiment," "another embodiment," or the like is not necessarily to only one embodiment, and different references to any such phrases are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The invention encompasses numerous alternatives, modifications and equivalents to the disclosed embodiments. Numerous specific details are set forth in the following description in order to provide a thorough understanding of the invention. These details are provided for the purpose of example; the invention may be practiced without some or all of these specific details. For clarity, technical material that is known in technical fields related to the invention has not been described in detail so that the invention is not unnecessarily obscured.

Figure 1:
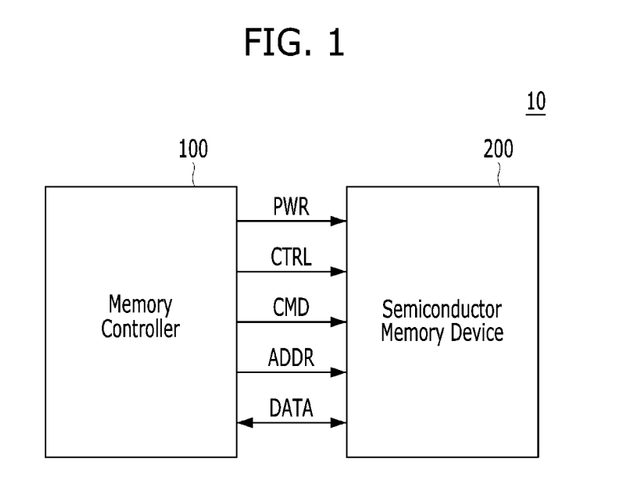
FIG. 1 is a block diagram illustrating a memory system in accordance with one embodiment of the present invention.

FIG. 1 is a block diagram schematically illustrating a memory system in accordance with one embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as for example a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
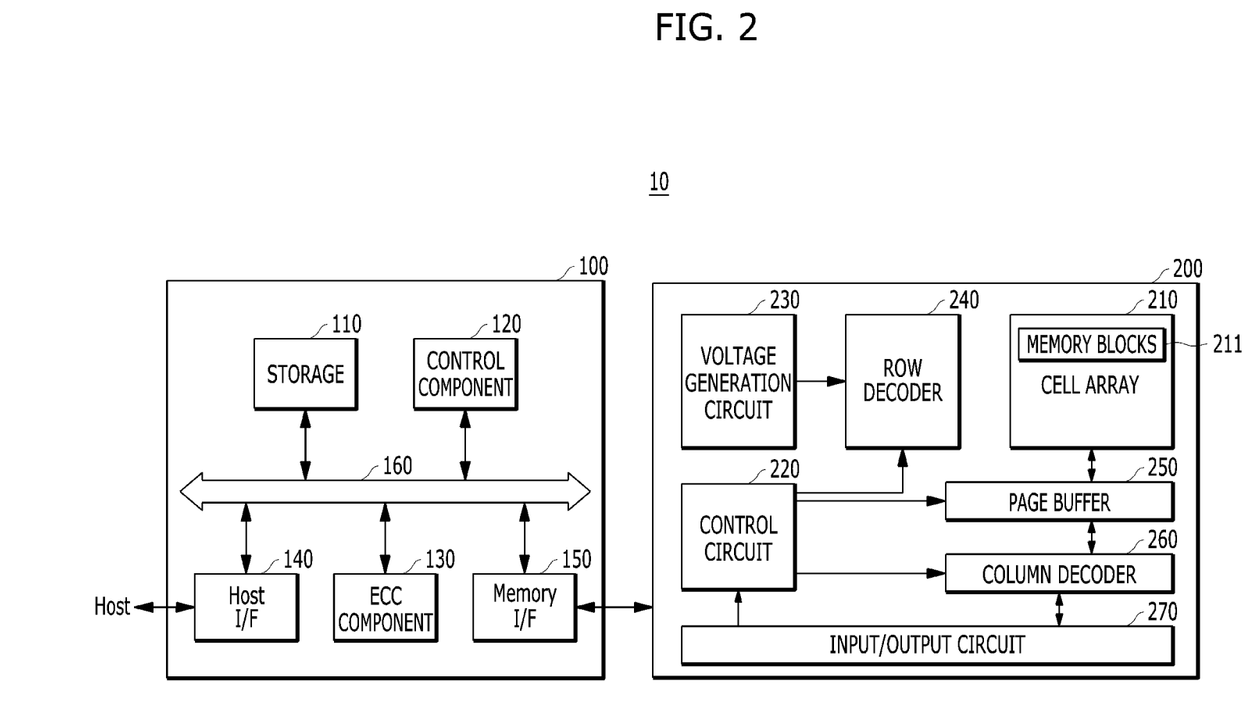
FIG. 2 is a block diagram illustrating a memory system in accordance with another embodiment of the present invention.

FIG. 2 is a detailed block diagram illustrating a memory system in accordance with another embodiment of the present invention. For example, the memory system of FIG. 2 may depict the memory system shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as for example a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as for example a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as for example a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and write and read operations for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on coded modulation techniques such as for example a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM). As such, the ECC component 130 may include circuits, systems or devices for suitable error correction operation. In particular, the ECC component 130 may include an encoder and an LDPC decoder, e.g., a single LDPC chip-kill decoder.

Chipkill is a form of advanced error checking and correcting that protects computer memory systems from any single memory chip failure as well as multi-bit errors from any portion of a single memory chip. Causes of a failure may be due to defects during the manufacturing process, mechanical stress to the device prior to or during use, degradation of the dielectric material in memory cells, among others. Failures may occur at the memory cell level, which may propagate and cause failures within other components of non-volatile memory. Prior chipkill schemes have computed parities (using the exclusive OR (XOR) operation) based on memory cells from the same bitline, which results in it being more difficult to recover from a bitline failure, which is most commonly observed in NAND flash memory. Prior chipkill schemes have scattered bits of a Hamming code ECC word across multiple memory chips, such that the failure of any single memory chip will affect only one ECC bit per word. This allows memory contents to be reconstructed despite the complete failure of one chip. For example, soft chipkill recovery can be advantageously used if one or more components of non-volatile memory fails prior to or during operation of non-volatile memory system.

Referring back to FIG. 2, the host interface 140 may communicate with the host device through one or more of various interface protocols such as for example a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as erase and pass voltages.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
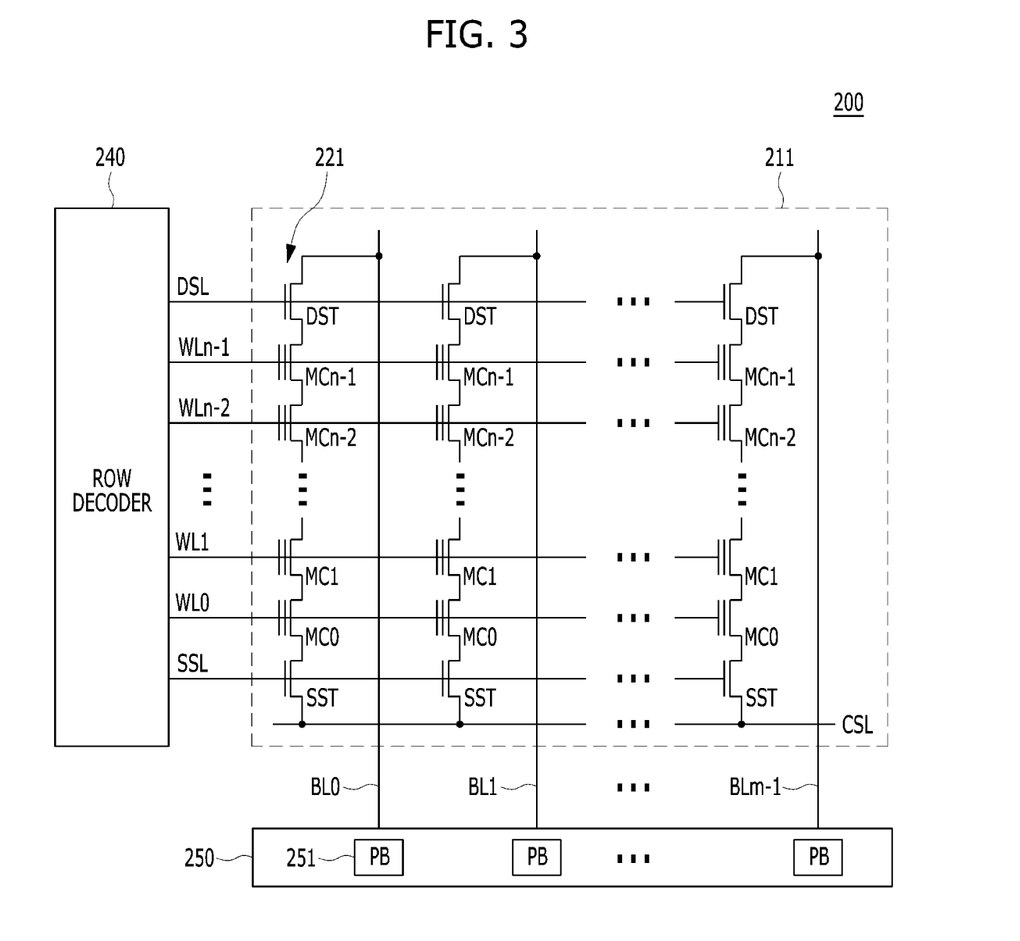
FIG. 3 is a circuit diagram illustrating a memory block of a memory device of a memory system in accordance with still another embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with another embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer 250 may include a plurality of separate page buffers PB 251 that are coupled to the bit lines BL0 to BLm-1. The page buffers PB 251 may operate in response to page buffer control signals. For example, the page buffers PB 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
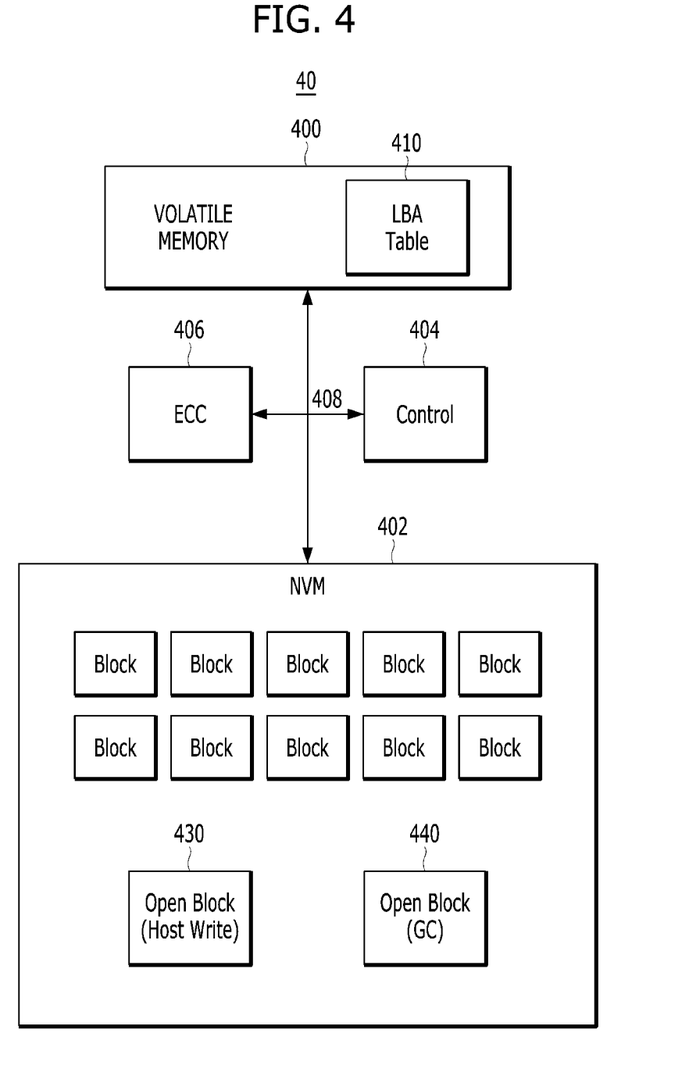
FIG. 4 is a schematic diagram of a memory system in accordance with yet another embodiment of the present invention.

Referring to FIG. 4, a general example of a memory system 40 is schematically illustrated. The memory system 40 may include a volatile memory 400 (e.g., a DRAM), a non-volatile memory (NVM) 402 (e.g., NAND), a control component or control logic 404, such as described herein, an error correcting code (ECC) module 406, such as described herein, and a bus 408 through which these components of the memory system 40 communicate. The volatile memory 400 may include a logical bit address LBA table 410 for mapping physical-to-logical addresses of bits. The NVM 402 may include a plurality of memory blocks (and/or a plurality of super memory blocks), as well as an open block for host writes 430 and an open block for garbage collection (GC) 440. Multiple memory blocks may be grouped together as a superblock for certain functional purposes. While FIG. 4 shows a general memory system, additional/alternative components that may be utilized with memory systems to effectuate the present invention will be understood to those of skill in the art in light of this disclosure.

Conventional Chipkill Recovery

Figure 5A:
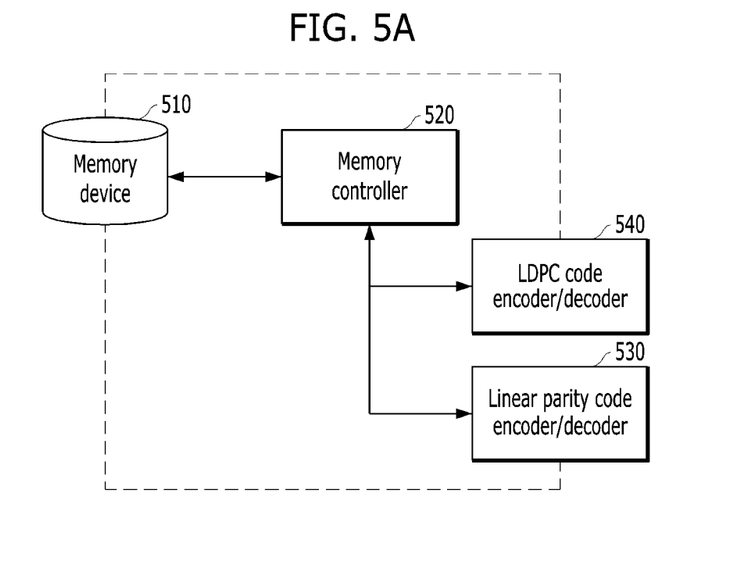
FIG. 5A is a schematic diagram of a memory system having memory controller using a low density parity check (LDPC) code encoder/decoder in accordance with yet another embodiment of the present invention.

FIG. 5A is a block diagram illustrating an exemplary storage system for soft chipkill recovery of bitline failures. As illustrated in FIG. 5A, data is stored on a memory device 510 (e.g., NAND Flash). A memory controller 520 is used to access the data stored on the memory device 510 and interface with two types of error correcting codes that are typically used to ensure the reliability of memory-low-density parity check (LDPC) codes and linear binary codes with parity checks. As illustrated in FIG. 5A, both the LDPC code module 540 and the linear parity code module 530 interface with both the memory controller 520 and the memory device 510. Typically, the LDPC code and linear parity code modules (540 and 530, respectively) include both encoding and decoding functionality, and may support a variety of codeword sizes and code rates. In some embodiments, some or all of the modules in FIG. 5A are implemented using semiconductor components, such as an application-specific integrated circuit (ASIC) or a field-programmable gate array (FPGA).

In one example of chipkill recovery, all wordlines in a block are read and decoded through the LDPC decoder. Successfully decoded wordlines data can be used to find bitline error locations based on the intersection of all errors across successfully decoded data. For example, locations where bits are always in error may be identified as potential candidates having experienced a bitline failure. This method leverages the fact that errors are randomly distributed, and therefore, the probability that errors lie on same location in a block is quite low.

Figure 5B:
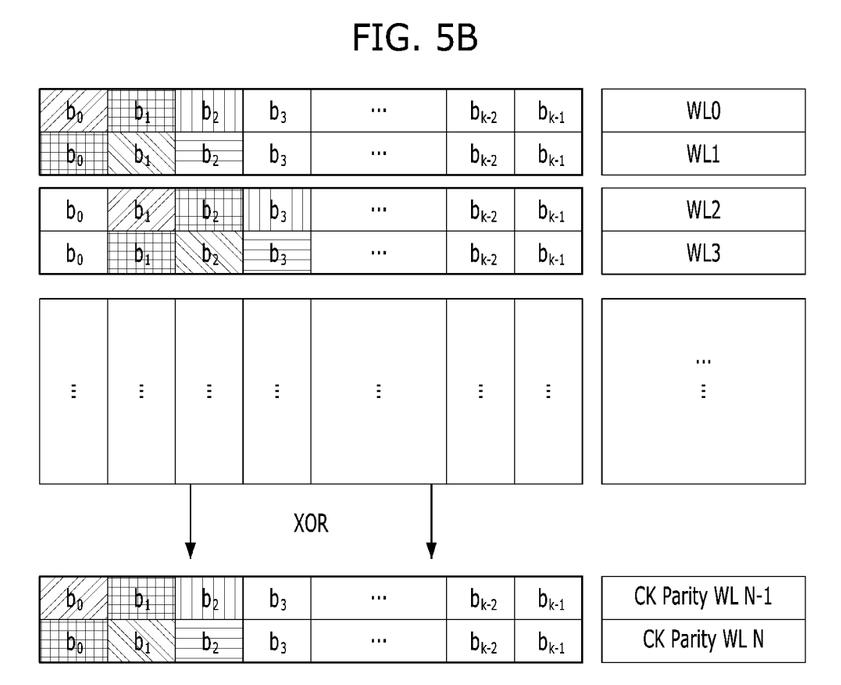
FIG. 5B is a schematic illustrating a particular example of generating chipkill parity in accordance with one embodiment of the present invention.

FIG. 5B illustrates a particular example of generating chipkill parity. As illustrated therein, each wordline (indicated as WL 0, WL 1, WL 2, . . . in FIG. 5B) includes memory cells whose contents have been encoded using the LDPC code. The parity bits of the parity codeword are generated based on XOR operations over data bits that are distributed across different word lines, as illustrated by the differently shaded bits in FIG. 5B. For example, a first parity bit may be generated based on bit b0 in WL 0, bit b1 in WL 2, and so on (e.g., a diagonal distribution), and a second parity bit based on bit b0 in WL 1, bit b1 in WL 3, and so on. As shown in FIG. 5, for every N WLs (WL0 to WL_N-1), the CK parity is the XOR of all these WLs which is stored in WL_N. That is for each N bits of data on the same bitline, one additional bit (their XOR) is stored as CK parity. The chipkill parities can be appended as an "outer parity" to the codeword. In the extreme case, failure with all the decoding attempts such as (hard decoding, soft decoding, . . . ), there is still chance of recovering each bit using CK method (with the help of CK parity).

Figure 6:
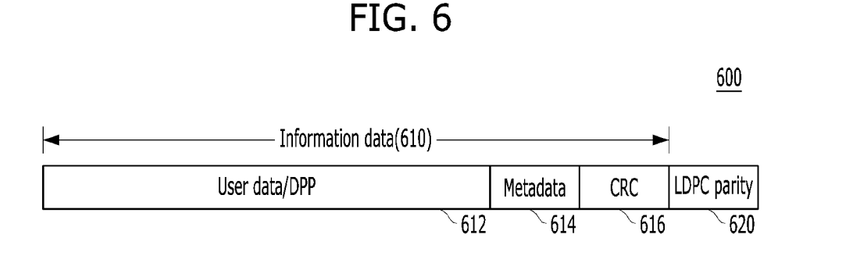
FIG. 6 is a schematic illustrating a codeword stored in a memory block containing user data and parity information in accordance with another embodiment of the present invention.

FIG. 6 is a diagram illustrating a format of a codeword 600 to be stored in a storage system. Referring to FIG. 6, the codeword 600 of the present invention may include information data 610 and parity data 620. In some embodiments, the codeword 600 may be generated based on the coded modulation techniques described above such the low-density parity-check (LDPC) codes. In other words, the information data 610 may be protected by LDPC codes, and the parity 620 may be a LDPC parity while the parity may also include a chipkill (CK) parity. The information data 610 may include user data with data path protection (DPP) 612, meta-data 614, and cyclic redundancy check (CRC) parity bits 616. A CRC code which is an error-detecting code commonly used in digital networks and storage devices may detect accidental changes to raw data.

A classical chipkill, or XOR scheme is implemented in most of the SSDs today to deal with media defects such as die/block/WL failure. The basic idea is to XOR some sectors into a parity sector. In the case that a sector fails the soft read/decode or the sector is lost due to media defect, data can be read back by reading/XORing the remaining sectors on the same stripe SUPER ChipKill, SCK, stands for Soft Uncorrectable Page Error Recovery, is a data recovery feature for XOR or chipkill. In the write-path, n-1 data codewords are XORed into a parity codeword. In the read-path, if there is only one codeword failure with soft decoding, the remaining codewords on the same memory stripe will be read and XORed to recover the failed codeword. If there are more than one failed codeword on the memory stripe, SCK allows recovery of a codeword which failed its soft decode even when there are k≥2 codewords (including itself) failing the soft decode on the same memory stripe. Even when there are k≥2 codewords (including itself) failing the soft decode on the same stripe, a parity codeword such as an outer code such as for example a single parity code (SPC) is used. In one embodiment of the invention, two coding mechanisms are used in any storage medium. Typically, LDPC code is used as an inner code, which usually recovers data without failure. In the case of inner code failure, a CK/SCK can be used (with only one bit additional parity for each N bits on the same bitline) as an outer code to recover the failure. In this case, the outer code is only used when the inner code has failed, and there is no other way to recover the data. The outer code provides another layer of data protection.

In one embodiment of the invention. soft decoding is applied across failed codewords over a non-zero coset, which is equal to the XOR of all successfully decoded codewords on the same stripe. If there is another or multiple sectors that fail the soft read/decode during the chipkill recovery process, i.e., reading/XORing the rest sectors on the same stripe, the data will be lost, and an UECC event will be reported to host.

For example, assume the length of code is 4, and in the stripe assume that there are two soft decoding failures, while the rest of pages in the stripe decode successfully. Also assume XORing all the successful pages in the stripe provides a result of [1, 0, 0, 1]. This is a non-zero coset that can be used for recovering the two failed codeword in the stripe. The non-zero coset reveals that the XOR of first (or forth) bits in the two failed codeword should be 1. Also, it reveals that the XOR of 2nd (or 3rd) bits in the two failed codewords should be 0. This information can be used to provide more accurate LLRs as the input of soft decoder. SCK algorithm uses this non-zero coset to improve the input LLR for the soft decoding of failed codewords. Constructing such codes as the outer code may be performed by an encoder in the ECC component 130 of FIG. 2 or the ECC module 406 of FIG. 4.

If the intended codeword fails decoding and all other codewords in the stripe decoded successfully, conventional CK can recover the intended codeword perfectly. SCK helps when there are other codewords failures other than intended codeword in the stripe, which conventional CK is unable to recover. In that case, SCK can be used to recover the intended codeword in the following manner. In SCK, the XOR of all successfully decoded codewords and the LLRs from all other failed codewords on the same stripe are combined to generate the LLR for the intended codeword. The soft decoder decodes the intended codeword with the generated LLRs, and either successfully decodes the failed codeword or declares a failure if it reaches max iteration and is not able to converge.

Inventive Selective Decoding

In one embodiment of the inventive selective decoding scheme, i) the raw bit error rate RBER of failed codewords are estimated, ii) the failed sectors are sorted from best to worst case (e.g., based on their estimated RBER), and iii) SCK decoding is applied to one failed sector to another from best case to worst case (the best case having the highest probability of successful decoding and the worst case having the lower probability of successful decoding).

In this inventive scheme for SCK decoding. the chance of successful SCK decoding for all the failed codewords is improved by first SCK decoding to recover one of the failed codeword (e.g., the easiest one which may for example have the lowest RBER to produce a recovered codeword).

Once a failed codeword is recovered, the recovered codeword can be XORed into the successful group, and the former failed codeword no longer affects the chance of successful decoding in future. This process can continue until all codewords are corrected.

In general, in this inventive scheme, a failed sector of a memory block is sorted from a first set of the failed codewords having a higher probability of being successfully decoded to a second set of the failed codewords having a lower probability of being successfully decoded, and a super chip kill SCK operation is performed on one of the failed codewords in the first set to produce a recovered codeword. The present invention has recognized (as FIG. 7 shows) that the correction capability of SCK increases significantly when the number of remaining failed codewords is reduced.

SCK with Early Termination

Figure 7:
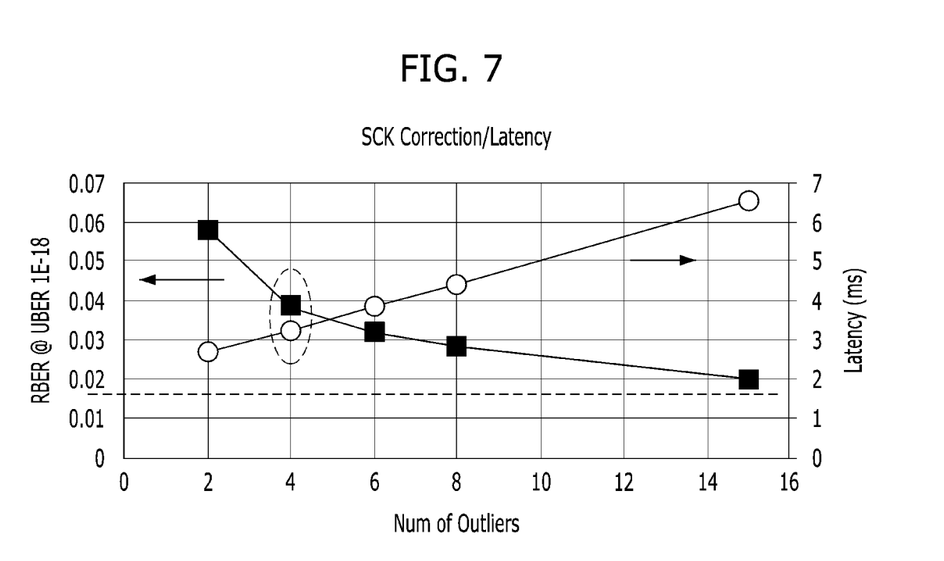
FIG. 7 is a schematic illustrating that the correction capability and latency for super chip kill (SCK) decoding as a function of the number of failed codewords or outliers, in accordance with yet another embodiment of the present invention.

From NAND data shown in FIG. 7, the present invention has also recognized that there are only a few outlier pages on the same stripe failing soft decoding. The percentage of such outliers is less than 0.5% in many NAND devices. Accordingly, there is no need to consider cases where there are more than a preset number of failures. In one embodiment of the invention, the SCK operation is terminated (thereby limiting the worse case latency for SCK operation) if there are more than a preset number of failures (e.g., k_th number of outliers). The correlation between latency and correction of SCK is shown in FIG. 7.

Failure Margin Estimator

For all the failed codewords on the same stripe, even though they all failed, the chance of successful decoding with SCK is different. Besides RBERs, an initial checksum (prior to iterative decoding), a number of decoding iterations having reached a preset threshold, and a checksum can be used as indicators of which failed codewords have a higher chance of decoding. In one embodiment of the invention, there is provided a failure margin estimator which is a function of those aforementioned indicators. This estimator provides higher value for codewords that have a higher chance of decoding.

As an example, let $c\_1, c\_2, \ldots, c\_n$ be the codewords in CK/SCK stripe (usually $c\_n = c\_1 \oplus \ldots \oplus c\_(n-1)$). Without loss of generality, assume, the intended host read is codeword c_1. In the drive, c_1 given the optimal read strategy fails, the drive reads all other codewords c_2, c_3, . . . , c_n. Using a combination of hard information (for successfully decoded codewords) and LLR (for failed codewords), SCK tries to provide a better LLR (better than original channel LLR) for the intended host read c_1.

WLOG, assume that the codewords c_1, c_2, . . . , c_k are the failed codewords. In conventional SCK, the LLRs for codeword c_1 is modified using decoding results and LLRs of rest of the codewords in the stripe. Then, the decoding attempt is repeated for intended codewords c_1 using the improved input LLRs (a combination of original channel LLR and the LLRs from SCK calculation).

As FIG. 7 shows, the correction capability of SCK increases significantly when the number of remaining failed codewords is smaller. That means the SCK can correct c_1 with RBER_sck (k=2)<6E-2 when the number of failed codewords k=2. However, SCK can correct c_1 with RBER_sck (k=4)<4E-2 when the number of codewords failures k=4. The following example illustrates improvement for the SCK correction performance by modifying the conventional algorithm.

EXAMPLE

Assume the ECC soft decoding correction capability RBER=2E−2. Assume n=64, k=4, where n is the stripe size that is the number of codewords that are XORed in the stripe, and k is the number of acceptable failures in SCK. Thus, K=2 means the SCK is terminated if number of codeword failures are more than 2. The RBER for failed codewords set {rber_1, rber_2, rber_3, rber_4}={5.5E-2, 4.5E-2,2.5E-2,5E-2}. In conventional SCK, c_1 with rber_1=5E-2 is not correctable because rber_1>rber_sck (k=4). However, in the inventive scheme, it is possible to first correct c_3 (treat c_3 as intended codeword) with rber_3=2.5E-3. Since rber_3<rber_sck (k=4), the SCK succeeds for c_3. After correcting c_3, the remaining set of failed codewords are c_1, c_2, c_4 with k=3. The correction capability for SCK with k=3 is RBER_sck (k=3)=5E-2. That means c_2 can now be corrected next (rber_2<rber_sck (k=3)). After c_2 and c_3 are corrected, SCK can be used to correct c_1 because rber_1<rber_sck (k=2).

In one embodiment of the invention, while the RBERs for failed codewords are not known, all that is needed is an estimation of the RBER for failed codewords. With a suitable estimation of RBER, it is possible to sort the failed codewords from the best case to the worst case. The best failed codeword can be estimated using a function of failed decoding attempt observables such as (the initial checksum, the number of decoding iterations having reached a certain threshold, the end checksum, etc.).

Pseudo-Code for Selective Decoding SCK

Figure 8:
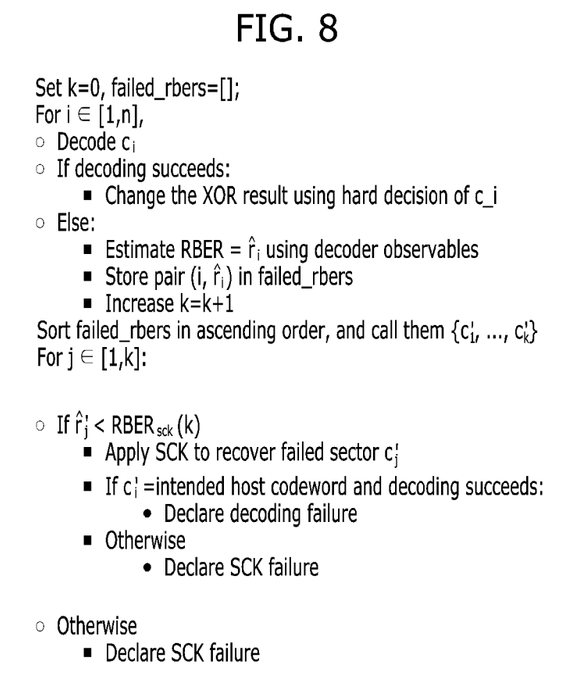
FIG. 8 is a schematic showing a depiction of pseudo-code for selective SCK decoding in accordance with still another embodiment of the present invention.

FIG. 8 is a depiction of pseudo-code for selective decoding SCK. The pseudo-code shows an example of coding that increases the correction capability of SCK by sorting the failed codeword in the stripe based on their RBER in ascending order. The SCK then tries to decode each codewords in the sorted order until the original intended codeword is reached. Like the example above which shows for the case of ECC soft decoding correction capability RBER=2E-2 an increase the correction capability of SCK, this pseudo-code provides in software a way to increase the correction capability of SCK.

Selective Decoding Algorithm

Figure 9:
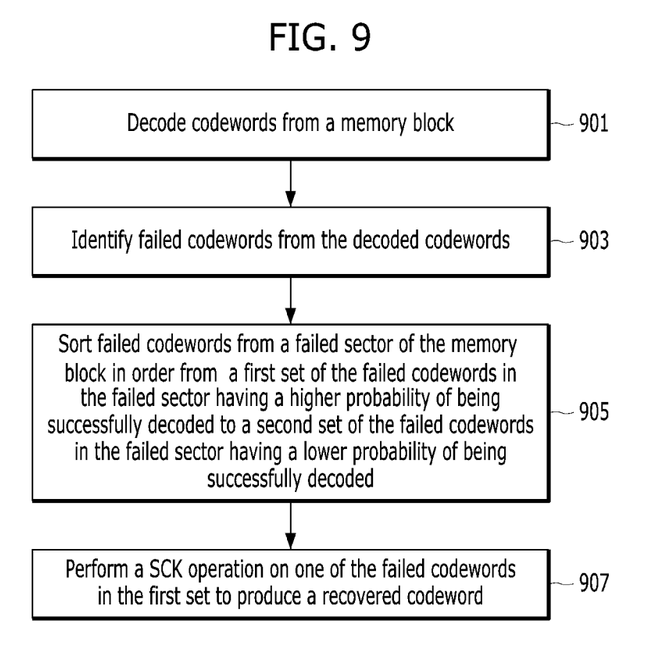
FIG. 9 is a flow chart of a method for selective decoding a memory block using super chip kill SCK in accordance with one embodiment of the present invention.

FIG. 9 illustrates a method for selective decoding a memory block using SCK. In this method, it is assumed that a memory block comprises n codewords (such as codeword 600 in FIG. 6), that one or more check parities are calculated based on bit values in the codeword and that there are number of codewords that can be corrected and some that may fail to be corrected. Such failures may be due to for example one or more bad word lines.

The method illustrated in FIG. 9 begins at 901 by decoding codewords from the memory block. At 903, the method continues by identifying failed codewords from the decoded codewords. At 905, the method continues by sorting failed codewords from a failed sector of the memory block in order from a first set of the failed codewords in the failed sector having a higher probability of being successfully decoded to a second set of the failed codewords in the failed sector having a lower probability of being successfully decoded. At 907, the method continues by performing a super chip kill SCK operation on one of the failed codewords in the first set to produce a recovered codeword.

In this method, the first set of the failed codewords can have lower estimated raw bit error rates RBERs than the second set of the failed codewords. The first set may include a best case failed codeword having the lowest estimated RBER of all the estimated RBERs in the failed sector, and the second set may include a worst case failed codeword having the highest estimated RBER of all the estimated RBERs.

In this method, the super chip kill SCK operation may be performed on the failed sector in order of the best case failed codeword to the worst case failed codeword.

In this method, failed decoding attempt observables may be used to estimate a probability of a failed codeword being successfully decoded. Furthermore, a failure margin estimator may be used to provide relative values for the failed codewords to be properly decoded based on the failed decoding attempt observables. The failed decoding attempt observables may comprise at least one or more of an initial checksum of a failed codeword prior to decoding, a number of decoding iterations for the failed codeword prior to a threshold number of iterations, and an end checksum of the failed codeword after the iterations.

In this method, the SCK operation on one of the failed codewords may be terminated when there are more than a preset number of decoding failures. The termination of the SCK operation on one of the failed codewords can reduce an overall latency of the SCK operation in decoding the memory block. Furthermore, in the SCK operation, the recovered codeword can reduce the number of failed codewords and increase a probability of another failed codeword being recovered.

In another embodiment of the present invention, there is provided a memory system having a memory block, and a memory controller in communication with the memory block, wherein the memory controller is configured to: decode codewords from the memory block, identify failed codewords from the decoded codewords, sort failed codewords from a failed sector of the memory block in order from a first set of the failed codewords in the failed sector having a higher probability of being successfully decoded to a second set of the failed codewords in the failed sector having a lower probability of being successfully decoded, and perform a super chip kill SCK operation one of the failed codewords in the first set to produce a recovered codeword.

In this system, the first set of the failed codewords may have lower estimated raw bit error rates RBERs than the second set of the failed codewords. The first set may include a best case failed codeword having the lowest estimated RBER of all the estimated RBERs in the failed sector, and the second set may include a worst case failed codeword having the highest estimated RBER of all the estimated RBERs.

In this system, the memory controller can be configured to perform the super chip kill SCK operation on the failed sector in order of the best case failed codeword to the worst case failed codeword. The memory controller can be configured to utilize failed decoding attempt observables to estimate a probability of a failed codeword being successfully decoded. The memory controller can be configured to utilize a failure margin estimator to provide relative values for the failed codewords to be properly decoded based on the failed decoding attempt observables. Furthermore, the failed decoding attempt observables may comprise at least one or more of an initial checksum of a failed codeword prior to decoding, a number of decoding iterations for the failed codeword prior to a threshold number of iterations, and an end checksum of the failed codeword after the iterations.

In this system, the memory controller can be configured to terminate the SCK operation on one of the failed codewords when there are more than a preset number of decoding failures. Termination of the SCK operation on one of the failed codewords can reduce an overall latency of the SCK operation in decoding the memory block. Furthermore, in the SCK operation, the recovered codeword can reduce a number of failed codewords and increases a probability of another failed codeword being recovered.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "system" or "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

What is claimed is:

1. A memory system comprising:
   a memory block; and
   a memory controller in communication with the memory block, wherein the memory controller is configured to:
   decode codewords from the memory block,
   identify failed codewords from the decoded codewords,
   sort failed codewords from a failed sector of the memory block in order from a first set of the failed codewords in the failed sector having a higher probability of being successfully decoded to a second set of the failed codewords in the failed sector having a lower probability of being successfully decoded, and perform a soft uncorrectable page error (super) chip kill (SCK) operation by determining, from successfully decoded pages in a stripe of the failed sector, information on which bits in the failed codewords are in error and using this information to generate a log likelihood ratio (LLR) for decoding one of the failed codewords in the first set which has the lowest bit error rate in the failed sector to produce a recovered codeword.

2. The memory system of claim 1, wherein the first set of the failed codewords has lower estimated raw bit error rates RBERs than the second set of the failed codewords.

3. The memory system of claim 2, wherein the memory controller is configured to perform the SCK operation on the failed sector in order of the best case failed codeword to the worst case failed codeword.

4. The memory system of claim 1, wherein
the first set includes a best case failed codeword having the lowest estimated RBER of all estimated RBERs in the failed sector, and
the second set includes a worst case failed codeword having the highest estimated RBER of all the estimated RBERs.

5. The memory system of claim 1, wherein the memory controller is configured to utilize failed decoding attempt observables to estimate a probability of a failed codeword being successfully decoded.

6. The memory system of claim 5, wherein the memory controller is configured to utilize a failure margin estimator to provide relative values for the failed codewords to be properly decoded based on the failed decoding attempt observables.

7. The memory system of claim 6, wherein the failed decoding attempt observables comprise at least one or more of an initial checksum of a failed codeword prior to decoding, a number of decoding iterations for the failed codeword prior to a threshold number of iterations, and an end checksum of the failed codeword after the iterations.

8. The memory system of claim 1, wherein the memory controller is configured to terminate the SCK operation on one of the failed codewords when there are more than a preset number of decoding failures.

9. The memory system of claim 8, wherein the termination of the SCK operation on one of the failed codewords reduces an overall latency of the SCK operation in decoding the memory block.

10. The memory system of claim 1, wherein, in the SCK operation, the recovered codeword reduces a number of failed codewords and increases a probability of another failed codeword being recovered.

11. A method for selective decoding a memory block using soft uncorrectable page error (super) chip kill (SCK), comprising:

decoding codewords from the memory block;
identifying failed codewords from the decoded codewords;
sorting failed codewords from a failed sector of the memory block in order from a first set of the failed codewords in the failed sector having a higher probability of being successfully decoded to a second set of the failed codewords in the failed sector having a lower probability of being successfully decoded, and
performing a SCK operation by determining, from successfully decoded pages in a stripe of the failed sector, information on which bits in the failed codewords are in error and using this information to generate a log likelihood ratio (LLR) for decoding one of the failed codewords in the first set which has the lowest bit error rate in the failed sector to produce a recovered codeword.

12. The method of claim 11, wherein the first set of the failed codewords has lower estimated raw bit error rates RBERs than the second set of the failed codewords.

13. The method of claim 12, further comprising performing the SCK operation on the failed sector in order of the best case failed codeword to the worst case failed codeword.

14. The method of claim 11, wherein
the first set includes a best case failed codeword having the lowest estimated RBER of all the estimated RBERs in the failed sector, and
the second set includes a worst case failed codeword having the highest estimated RBER of all the estimated RBERs.

15. The method of claim 11, wherein the estimating comprises:
using failed decoding attempt observables to estimate a probability of a failed codeword being successfully decoded.

16. The method of claim 15, further comprising using a failure margin estimator to provide relative values for the failed codewords to be properly decoded based on the failed decoding attempt observables.

17. The method of claim 16, wherein the failed decoding attempt observables comprise at least one or more of an initial checksum of a failed codeword prior to decoding, a number of decoding iterations for the failed codeword prior to a threshold number of iterations, and an end checksum of the failed codeword after the iterations.

18. The method of claim 11, wherein the SCK operation on one of the failed codewords is terminated when there are more than a preset number of decoding failures.

19. The method of claim 18, wherein the termination of the SCK operation on one of the failed codewords reduces an overall latency of the SCK operation in decoding the memory block.

20. The method of claim 11, wherein, in the SCK operation, the recovered codeword reduces a number of failed codewords and increases a probability of another failed codeword being recovered.

\* \* \* \* \*